Figure 1:
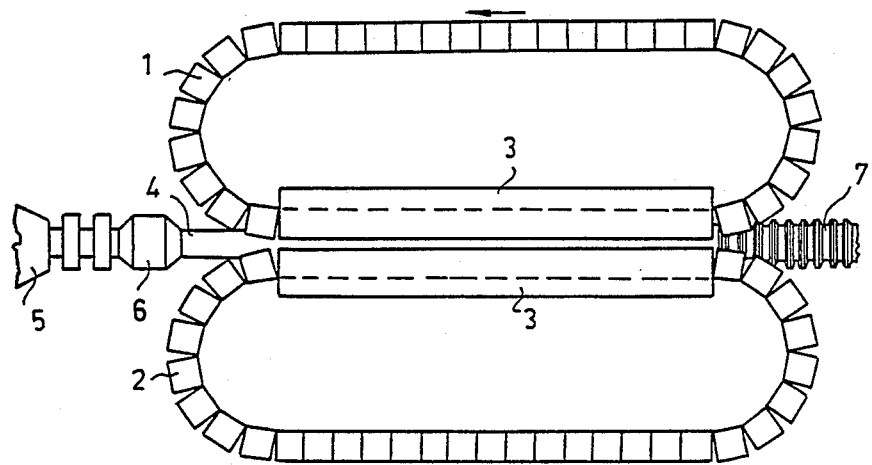

United States Patent [19]

Järvenkylä

[11] Patent Number: 4,865,797
[45] Date of Patent: Sep. 12, 1989

[54] METHOD AND AN APPARATUS FOR THE EXTRUSION OF PLASTIC PIPES

[75] Inventor: Jyri Järvenkylä, Salpakangas, Finland

[73] Assignee: Uponor N.V.

[21] Appl. No.: 234,498

[22] PCT Filed: Jan. 20, 1988

[86] PCT No.: PCT/FI88/00005
§ 371 Date: Aug. 19, 1988
§ 102(e) Date: Aug. 19, 1988

[87] PCT Pub. No.: WO88/05377
PCT Pub. Date: Jul. 28, 1988

[30] Foreign Application Priority Data

Jan. 22, 1987 [DE] Fed. Rep. of Germany ....... 3701822

[51] Int. Cl.$^4$ ............................................. B29C 47/20
[52] U.S. Cl. ..................... 264/508; 264/515; 264/167; 264/209.5; 425/133.1; 425/326.1; 425/327; 425/393; 425/396
[58] Field of Search ............... 264/508, 515, 505, 173, 264/167, 506, 209.3–209.5; 425/396, 393, 326.1, 532, 325, 327, 388

[56] References Cited

U.S. PATENT DOCUMENTS

| | | | |
|---|---|---|---|
| 3,280,430 | 10/1966 | Antrobus | 425/532 |
| 3,732,046 | 5/1973 | Martin et al. | 425/445 |
| 3,743,456 | 7/1973 | Cini | 425/133.1 |
| 3,751,541 | 8/1973 | Hegler | 264/508 |
| 3,919,367 | 11/1975 | Maroschak | 264/508 |
| 4,500,284 | 2/1985 | Lupke | 425/326.1 |
| 4,509,911 | 4/1985 | Rosenbaum | 264/508 |
| 4,534,923 | 8/1985 | Lupke | 425/133.1 |
| 4,721,594 | 1/1988 | Järvenkylä | 264/508 |

FOREIGN PATENT DOCUMENTS 60-36143 2/1985 Japan ................... 264/173

Primary Examiner—Jeffery Thurlow
Attorney, Agent, or Firm—/////

[57] ABSTRACT

The invention relates to a method and an apparatus for the extrusion of plastic pipes. Today, plastic pipes are provided with a sleeve in such a manner that the end of the pipe is heated, whereafter the end is expanded by means of a mandrel or a pressure medium. This step requires a separate sleeve machine, and it also takes plenty of time and consumes thermal energy. According to the invention a sleeve (22) is formed in connection with the extrusion of a pipe in an apparatus in which a mandrel (8) is surrounded by chill moulds (1, 2) moving in the axial direction of the apparatus. The sleeve is formed by providing some of the chill moulds with a recess (16) the shape of which corresponds to that of the sleeve (22) and by pressing a plasticized plastic hose (11) extruded through a nozzle (10) against the walls of the recess in the area thereof by means of pressure air.

9 Claims, 2 Drawing Sheets

METHOD AND AN APPARATUS FOR THE EXTRUSION OF PLASTIC PIPES

This invention relates to a method for the extrusion of plastic pipes, wherein a hose formed of a plasticized plastic material is passed between a mandrel, a kernel having a substantially constant diameter and forming an extension of the mandrel, and chill moulds surrounding the mandrel and the kernel and moving in a sequence in the longitudinal direction of the apparatus; the hose is caused to be pressed against the mould surfaces of the chill moulds by press moulding; and sleeve parts are formed in the hose by pressing hose parts into recesses formed in the mould surfaces of the chill moulds and having a shape corresponding to that of the sleeve parts, said hose parts being pressed into the recesses by exposing the inner face of the hose to a higher pressure of a medium than the outer face thereof.

The ends of plastic pipes are often provided with an expanded portion, i.e. a sleeve, by means of which pipes can be joined into a pipe line. Often also extension pieces are used. Such extension pieces are short pipe pieces both ends of which are provided with a sleeve.

Today, sleeves are generally made by first heating the end of a pipe and by then pushing it on a mandrel having a diameter greater than the inner diameter of the pipe, as a result of which the end of the pipe is expanded into a sleeve. In place of a mandrel, the expansion can be made by means of a pressure medium in such a manner that the end of the pipe is pressed against an external mould by means of the medium, see e.g. German Offenlegungsschrift No. 1 801 179. The pressure medium may be a gas or a liquid.

The production methods mentioned above are slow as well as expensive. The methods are slow, because the production of pipes takes place in two steps, the step for the formation of a sleeve including heating, moulding and cooling. In addition, the pipes have to be transported to the sleeve machine and away therefrom. The methods are expensive, because the sleeves are usually formed by means of an automatic special machine. Further, the heating of the pipe end requires energy.

U.S. Pat. No. 4,003,685 discloses an apparatus for the production of corrugated plastic pipes by means of a blowing method. The apparatus comprises a nozzle, a mandrel, a projecting pipe and a plug provided at the end of the pipe for making contact with the inner face of the pipe. The pipe is provided with openings so that pressurized air can be blown into a space between the nozzle and the plug, as a result of which the plastic hose is pressed against the mould surface of the chill moulds. The mould surface of some of the chill moulds comprises a relatively large recess for the formation of sleeves in the pipe.

A drawback of this apparatus is its complicated structure and the unreliable sealing effect of the plug; further, it is not possible to provide two-layer pipes with sleeves by this method, because the inner wall would sink in even at places where this is not desirable.

The object of the present invention is to provide a method and an apparatus, by means of which sleeves can be formed in plastic pipes in a manner considerably simpler than what has been possible previously. The method according to the invention is characterized in that a space for the high-pressure medium within the hose is limited to the area of the recess of the mould by means of sealings which are formed adjacent the front and the back wall of the recess by means of plastic material positioned between the kernel and the chill moulds.

In the method according to the invention, no kind of sealing element is needed in the apparatus, because the plastic material itself acts as a sealing for the high-pressure medium space. Therefore the method can be realized at low costs. The way of sealing according to the invention is also extremely reliable since no leakages occur.

In the production of pipes having a ribbed outer face and smooth inner face, the above can be realized by creating the pressure difference when a chill mould rib positioned first after the mould recess is at the inlet point of the plastic material or when it has passed by it. Preferably the rib should be positioned within the area of the kernel.

Since the recess forming the sleeve part is at a greater distance from the mandrel than the rest of the mould surface of the chill moulds, the wall of a finished sleeve part is usually thinner than the wall of the pipe part. In ribbed pipes, the sleeve parts are not provided with ribs, which compensates the thinning to some extent. If desired, the wall thickness of the sleeve part can be maintained equal to that of the pipe part by transporting the chill moulds forwards at a speed lower than the normal speed during the formation of those pipe parts which are positioned within the area of the recess. It is to be noted that the wall thickness of sleeve parts produced by known methods is always smaller than the wall thickness of the pipe part.

The invention is also concerned with an apparatus for the extrusion of plastic pipes, comprising a substantially cylindrical mandrel, a kernel having a substantially constant diameter and forming an extension of the mandrel, chill moulds surrounding the mandrel to form a mould and moving around along an endless path in a sequence, the mould surface of the chill moulds comprising at least one recess which corresponds in shape to a sleeve part, a nozzle for feeding a hose formed of a plasticized plastic material between the mandrel and the kernel and the chill moulds, and means for pressing a part of the hose into the recess.

The apparatus according to the invention is characterized in that the kernel has at least the length of the mould recess in the axial direction of the kernel.

According to the invention the sealings of the pressure medium space are formed by themselves when the kernel has at least the length of the mould recess, because the space defined between the mould surface of the chill moulds and the kernel is wholly filled with the plastic material at the front and the back wall of the recess. The apparatus is simple, because no separate sealing is required.

Means for pressing a hose part into the recess may be formed by a pressure medium feeding element positioned in the kernel. In view of reliable operation, it is of advantage that the distance of the feeding element from the nozzle for the plastic material is thereby at least equal to the length of the recess in said direction.

At its simplest the pressure medium feeding element may be a peripheral groove formed on the surface of the kernel and communicating with an over-pressure source through a channel provided with a valve.

Alternatively, the hose part can, of course, be pressed to the bottom of the recess by means of an underpressure or vacuum created between the hose and the bottom of the recess.

Figure 2:
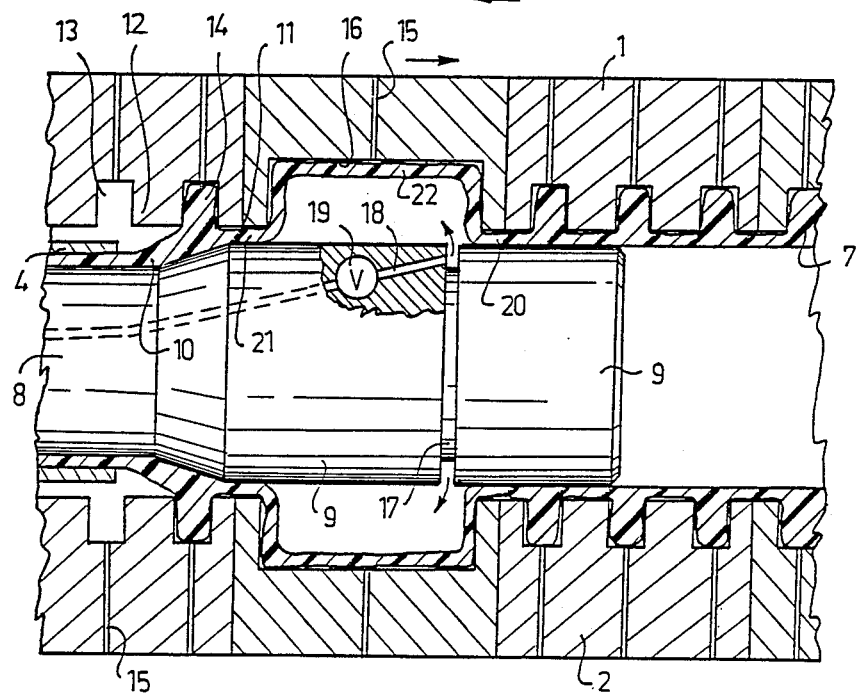
Figure 3:
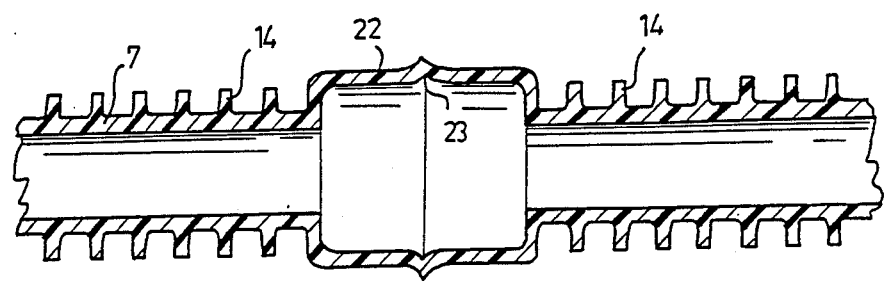
Figure 4:
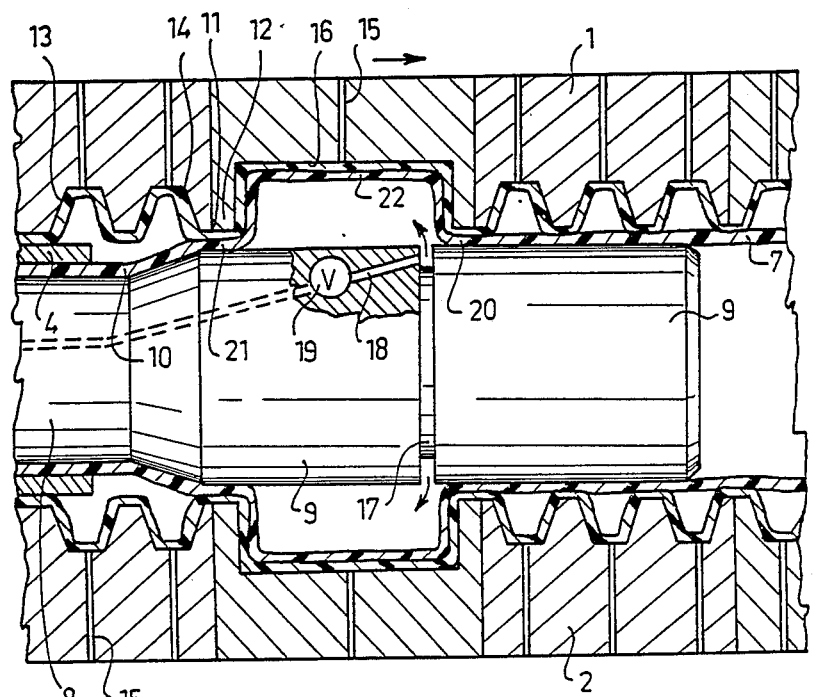

One preferred embodiment of the invention will be described in the following in more detail with reference to the attached drawing, wherein FIG. 1 is a general view of an apparatus for the production of corrugated or ribbed pipes, FIG. 2 is an enlarged longitudinal sectional view of a detail of an apparatus used for the production of ribbed pipes, FIG. 3 illustrates a finished ribbed pipe, and FIG. 4 is a longitudinal sectional view of a detail of an apparatus used for the production of two-layer pipes.

The apparatus shown in FIG. 1 comprises chill moulds 1 and 2 which move around along two endless paths and meet each other within the area of guide rails 3 to form a cylindrical mould. An extrusion sleeve 4 connected to an extrusion head 6 of an extruder 5 extends into the mould. FIG. 1 further shows how a finished pipe 7 protrudes from the other end of the mould formed by the chill moulds.

FIG. 2 illustrates more closely those parts of the apparatus which participate in the moulding of the pipe. A mandrel 8 having a straight portion and a conically enlarging portion is positioned on the central axis of the apparatus, and a kernel 9 having a constant diameter forms an extension of the mandrel. Cavities (not shown) for a cooling agent are provided at the terminal end of the kernel. The extrusion sleeve 4 and the kernel 9 define therebetween a ring nozzle 10 wherethrough plasticized plastic material is fed in the form of a hose 11 into a space formed between the chill moulds and the mandrel. For providing the pipe with a ribbed outer face, the inner surface of the chill moulds is provided with ring-shaped ribs 12 between which grooves 13 are formed into which the plastic material is pressed for the formation of ribs 14. The grooves 13 of the chill moulds may, as shown in FIG. 2, communicate with the atmosphere through channels 15 extending from the bottom of the grooves to the outer surface of the chill moulds.

At least one pair of chill moulds is, in place of the ribs 12 and the grooves 13, provided with a larger recess 16 the side and the bottom walls of which correspond in shape to the outer surface of the sleeve part of the pipe, being thus generally both deeper and longer in the axial direction of the apparatus than the grooves 13. The kernel 9, in turn, is provided with a peripheral groove 17 formed on the surface thereof, and a channel 18 communicating with a source (not shown) of a pressure medium, such as air, opens in the side wall of the groove 17. The channel 18 is provided with a valve 19. The groove 17 acts as a thermal barrier between the warm portion of the kernel closest to the mandrel and the cold portion at the free end of the kernel. It appears from FIG. 2 that the plastic material which fills the space between the chill moulds and the kernel forms sealings 20 and 21 close to the front and the back wall of the recess and that the distance of the groove 17 from the sealing point 21 is greater than the length of the recess 16 in the axial direction of the apparatus. The length of the kernel in the axial direction is at least equal to the length of the recess 16 in the same direction.

The apparatus shown in FIG. 2 operates in the following way. For the production of a ribbed plastic pipe, plasticized plastic material is fed through the nozzle 10 in the form of a hose 11 into the space defined between the chill moulds 1, 2 and the mandrel 8. When chill moulds having ribs and grooves 12, 13 on the mould surface thereof are situated at the nozzle 10, as shown in FIG. 2, the plastic material fills completely the space between the chill moulds and the mandrel, as also shown in FIG. 2. When the chill moulds 2 move to the right in FIG. 2, a solid-wall plastic pipe with a ribbed outer face and a smooth inner face is formed.

When the recess 16 reaches the nozzle 10, the hose 11, however, is not able to fill the entire recess due to its great volume, but the hose forms a layer which is slightly thicker than the normal wall thickness around the kernel 9, the increased thickness being due to the omission of the ribs 14. This is continued until the entire recess has passed by the nozzle 10, and a ribbed pipe begins to be formed again.

FIG. 2 illustrates a situation in which the recess 16 has just passed by the nozzle 10, and a groove 13 positioned first after the recess has already been filled with the plastic material. Since the hose 11 thereby fills entirely the space between the chill moulds and the kernel before and after the recess at the points 20 and 21, an isolated area is formed at the recess 16. After the front wall of the recess has passed by the groove 17 of the kernel, pressurized air is blown between the hose 11 and the kernel from the groove, see the arrows, as a result of which the hose, which rests against the kernel, is pressed against the walls of the recess in a manner shown in the figure. Pressurized air may be fed continuously from the groove 17; however, it is also possible to control the air feed by means of the valve 19 in such a manner that air is fed only when the recess 16 is positioned at the groove. The channels 15 communicating with the atmosphere allow the air which has filled the recess to be removed from the recess in connection with the moulding of the sleeve part. The sleeve part is indicated by the reference numeral 22. The pipe formed within the apparatus is cooled by means of a cooling liquid which flows in channels not shown at the free end of the kernel 9 and in the chill moulds 1, 2.

FIG. 3 illustrates part of a pipe produced by means of the apparatus according to the invention. A cooled pipe is cut off in the middle of the sleeve part, so that two pipes are formed, and one end of each pipe is provided with a sleeve. As appears from the figure, a shallow groove 23 is provided on the inside of the pipe at the cutting point. This groove can be formed easily by a corresponding shaping of the bottom of the recess. The groove makes it easier to push a straight pipe end into the sleeve. If desired, the pipe can be cut off inside the apparatus at the groove 23 by increasing the internal pressure of the pipe to a value at which the breaking limit of the hose is exceeded, so that the hose part positioned at the groove is removed through the channels 15.

In place of pressure air, or in order to intensify the effect of pressure air, a suction effect can be used for pressing the hose against the walls of the recess 16 by connecting the channels 15 opening in the recess 16 to a vacuum source.

The apparatus and the method according to the invention have been described above in connection with the production of pipes with solid walls and external ribs. However, the method can also be applied to an apparatus intended for the production of pipes having a smooth inner and outer wall or pipes having a hollow two-layer wall, the outer layer being corrugated. This kind of embodiment is shown in FIG. 4. The operation of the apparatus corresponds to the operation of the apparatus shown in FIG. 2 with the exception that pressure air is applied from the groove only when the recess 16 is positioned at the groove, because the wall might otherwise sink in. Thus, the pressure difference is created when a chill mould rib 12 positioned first after the mould recess has reached the kernel 9, and the pressure difference is eliminated before this rib 12 reaches the groove 17 of the kernel.

Besides air, the medium applied from the groove 17 may be some other gas or a liquid. It is also to be noted that even though it is of advantage in view of the production process that the hose is not pressed against the walls of the recess 16 until the sealing 21 is formed between the recess and the nozzle 10, it may also be possible to construct the apparatus in such a manner that the distance of the groove 17 from the nozzle 10 is smaller than the length of the recess 16 in the axial direction of the apparatus, so that the moulding of the sleeve part 22 is started already before the entire recess has passed by the nozzle. The channels 15 can be left out, if desired.

The wall of the sleeve part 22 can be made as thick as the wall of the pipe part by transporting the chill moulds forwards at a speed lower than the normal speed when the recess 16 is positioned in the area of the nozzle 10, with the result that the plastic layer on the surface of the mandrel becomes especially thick in the area of the recess, provided that the plastic material is fed through the nozzle at normal speed. It is also to be noted that it is possible to produce double sleeves by means of the invention, i.e. short pieces of pipe with sleeves opening in different directions at both ends thereof. Such double sleeves are used as extension pieces.

I claim:

1. A method for the extrusion of plastic pipes, wherein a hose formed of a plasticized plastic material is passed between a mandrel, a kernel having a substantially constant diameter and forming an extension of the mandrel, and chill moulds surrounding the mandrel and the kernel and moving in a sequence in the longitudinal direction of the apparatus; the hose is caused to be pressed against the mould surfaces of the chill moulds by press moulding; and sleeve parts are formed in the hose by pressing hose parts into recesses formed in the mould surfaces of the chill mould and having a shape corresponding to that of the sleeve parts, said hose parts being pressed into the recesses by exposing the inner face of the hose to a higher pressure of a medium than the outer face thereof so that a space for the high-pressure medium within the hose is limited to the area of the recess of the mould by means of sealings which are formed adjacent to the front and the back wall of the recess by means of the plastic material positioned between the kernel and the chill moulds.

2. A method according to claim 1, for producing pipes having a ribbed outer face and smooth inner face, wherein the pressure difference is created when a chill mould rib is positioned first after the mould recess has reached or passed by an inlet point of the plastic material.

3. A method according to claim 2, wherein the pressure difference is created when said rib has reached the kernel.

4. A method according to claim 1, wherein the chill moulds are transported forwards at a speed lower than the normal speed when hose parts to be positioned in the area of the recess are being formed.

5. A method according to claim 1, for producing two-layer pipes having a corrugated outer face and a smooth inner face, wherein the pressure difference is created when a chill mould rib is positioned first after the mould recess has reached the kernel, and that the pressure difference is eliminated before said rib reaches a pressure medium source provided in the kernel.

6. An apparatus for the extrusion of plastic pipes, comprising a substantially cylindrical mandrel, a kernel having a substantially constant diameter and forming an extension of the mandrel, chill moulds surrounding the mandrel to form a mould and moving around along an endless path in a sequence, the mould surface of the chill mould comprising at least one recess which corresponds in shape to a sleeve part, a nozzle for feeding a hose formed of a plasticized plastic material between the mandrel and the kernel and the chill moulds, and means for pressing a part of the hose into the recess formed by a pressure medium feeding element positioned in the kernel, wherein the kernel has at least the length of the mould recess in the axial direction of the kernel.

7. An apparatus according to claim 6, wherein the distance of the feeding element from the nozzle is at least equal to the length of the recess in the same direction.

8. An apparatus according to claim 6, wherein the pressure medium feeding element is formed by a peripheral groove provided on the surface of the kernel, said groove communicating with an over pressure source through a channel which is provided with a valve.

9. An apparatus according to claim 6, further comprising channels opening into the recess and communicating with a vacuum source.

* * * * *